H. PETERSEN.
LINOTYPE MOLD.
APPLICATION FILED MAY 1, 1911.
1,030,678.
Patented June 25, 1912.
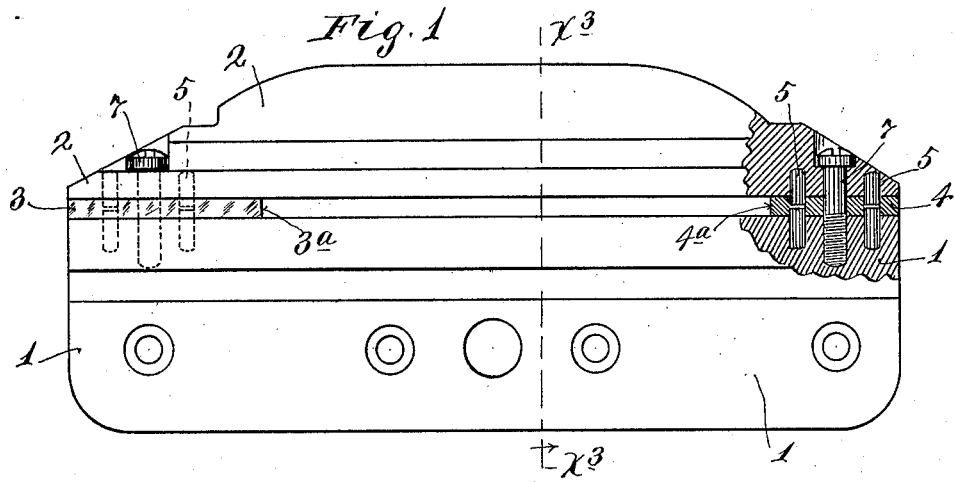
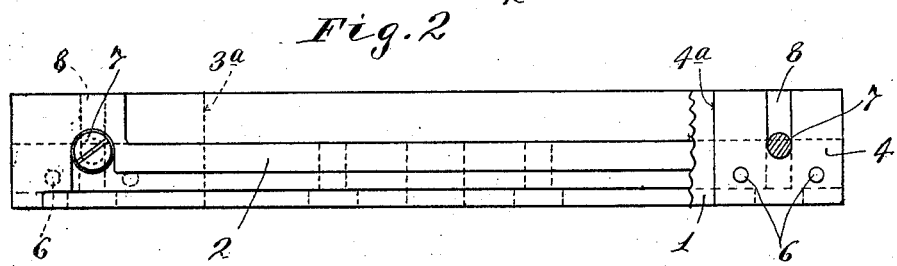
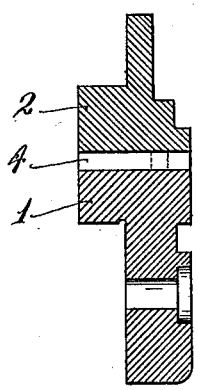
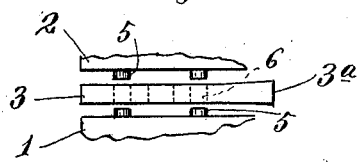
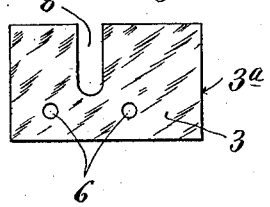
Witnesses.
A. H. Opsahl.
Harriet G. Crew.
Inventor.
Hans Petersen
By his Attorneys
Williamson & Merchant

UNITED STATES PATENT OFFICE.

HANS PETERSEN, OF MINNEAPOLIS, MINNESOTA, ASSIGNOR TO THE LINOGRAPH MANUFACTURING COMPANY, OF MINNEAPOLIS, MINNESOTA, A CORPORATION OF MINNESOTA.

LINOTYPE-MOLD.

1,030,678. Specification of Letters Patent. Patented June 25, 1912.

Application filed May 1, 1911. Serial No. 624,511.

*To all whom it may concern:*

Be it known that I, HANS PETERSEN, a citizen of the United States, residing at Minneapolis, in the county of Hennepin and State of Minnesota, have invented certain new and useful Improvements in Linotype-Molds; and I do hereby declare the following to be a full, clear, and exact description of the invention, such as will enable others skilled in the art to which it appertains to make and use the same.

My present invention has for its object to provide an improved linotype mold which will permit the type slug produced to be varied in length or thickness or in both dimensions, and to accomplish this in a mold of simplified construction and of reduced number of parts, and in which mold the component parts will be accurately and posiitively held in their proper relative positions.

To the above ends, generally stated, the invention consists of the novel devices and combinations of devices hereinafter described and defined in the claims.

More particularly stated, the improved mold comprises two main body members and intermediate spacing strips or liners, which latter may be removed and exchangeable for others of different dimensions, the said parts being detachably but rigidly held together by dowel pins and coöperating clamping screws or means.

The improved mold is illustrated in the accompanying drawings wherein like characters indicate like parts throughout the several views.

Referring to the drawings, Figure 1 is a front elevation of the complete mold, some parts being sectioned; Fig. 2 is a plan view of the mold, some parts being broken away; Fig. 3 is a vertical section taken on the line $x^3$ $x^3$ of Fig. 1; Fig. 4 is a view showing, in left hand end elevation, the parts of the mold separated and with some parts broken away; and Fig. 5 is a plan view of one of the end liners or spacing strips.

The mold comprises a body or base 1, a cap 2, and intermediate liners or spacing strips 3 and 4. The body and cap portions of the mold are provided with alined dowel pins 5 that fit in dowel holes or seats 6 of the liners or spacing strips 3 and 4. As another important feature of improvement, the inner or working edges of the liners or spacing strips 3 and 4 are made slightly flaring two thousandths of an inch. The working so that they are increased in thickness about or opposing faces of the body and cap portions of the mold are, of course, parallel. Hence, when these parallel surfaces of the body and cap are tightly drawn or clamped against the liners or spacing strips 3 and 4, extremely tight joints are insured at the working edges 3ª and 4ª.

For clamping the body and cap members together and onto the liners or spacing strips, screws 7 are preferably used. These screws, as shown, are countersunk into the cap, work loosely through perforations therein and through opening seats or notches 8 of the liners 3 and 4 and are screwed into the body or base 1.

The construction, above described, provides extremely simple and efficient means for retaining the different parts of the mold in their proper definite relation to each other, reduces the number of parts employed in the mold and also reduces the cost in the production of the mold. The flaring working edges 3ª and 4ª of the liners 3 and 4 make it an easy matter to secure a close and perfectly tight contact between the parts of the mold, at the working portions thereof, and insures a mold slot or cavity of uniform dimensions in spite of dust or dirt or the slight warping of the parts which sometimes takes place because of the heat to which they are subjected. When it is desired to exchange one or both of the liners for others, the binding screws 7 must be loosened sufficiently to permit disengagement of the dowel pins 5 from the seats 6 of the liners. This will permit substitution of liners and when the new liners have been inserted, the screws are again tightened and the component parts of the mold will be again rigidly and accurately secured together and held in proper relative position in respect to each other. While the clamping screws are desirable, other clamping means may be employed.

What I claim is:

1. A linotype mold comprising main body members and interposed liners, the latter having dowel pin seats and the said body members having axially alined dowel pins engageable in opposing pairs with the seats of said liners, and means clamping the said parts together, substantially as described.

2. A linotype mold comprising main body members and interposed liners, the latter having dowel pin seats and the said body members having axially alined dowel pins engageable in opposing pairs with the seats of said liners, and clamping screws loosely seated in one of the body members and having screw threaded engagement with the other body member and the said liners having notches through which the said screws are passed.

3. In a linotype mold, the combination with main body members having smooth parallel faces, of liners having their working edges made slightly thicker than the main body portions thereof, the said thickened working edges of the said liners being directly clamped between the opposing smooth faces of the said body members, whereby the greatest pressure is produced at the extreme working edges of the said liners.

In testimony whereof I affix my signature in presence of two witnesses.

HANS PETERSEN.

Witnesses:
BERNICE G. WHEELER,
HARRY D. KILGORE.

Copies of this patent may be obtained for five cents each, by addressing the "Commissioner of Patents, Washington, D. C."